T856 01S

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 335

504,062

ETHYLENE SULFIDE POLYMER COATING COMPOSITIONS

Frederick L. Walters, Levittown, and John P. Gallagher, Morrisville, Pa., assignors to Thiokol Chemical Corporation, Bristol, Pa., a corporation of Delaware

Filed Oct. 23, 1965. Published Nov. 12, 1968

Class 260—29.2

No Drawing. 9 Pages Specification

Stable liquid poly(ethylene sulfide) polymer coating compositions which yield substantially uniform, crack-free films and coatings are prepared by (1) Mechanically comminuting and screening the polymer to a particle size of about 0.1 to about 2.5 microns, preferably to a range of sizes from about 0.2 to about 1.0 micron and (2) Forming an aqueous colloidal dispersion containing 10 to 40% solids by the addition of water and ionic or non-ionic surface-active agents. Final coatings are obtained by fusing the films on substrates such as metals, ceramics, glass fabrics, asbestos fabrics, woven wire fabrics and heat treated polyacrylonitrile fabrics above the softening point of the polymer, preferably at about 225° C.